United States Patent [19]

Becker et al.

[11] 4,005,912
[45] Feb. 1, 1977

[54] LOW GROUND PRESSURE TRACK SHOE

[75] Inventors: Danny J. Becker, Peoria; Roger L. Boggs, East Peoria; Kennith E. Vaughn, Creve Coeur; James Richard Shuler, Eureka, all of Ill.

[73] Assignee: Caterpillar Tractor Co., Peoria, Ill.

[22] Filed: Aug. 18, 1975

[21] Appl. No.: 605,693

Related U.S. Application Data

[62] Division of Ser. No. 517,495, Oct. 24, 1974, Pat. No. 3,937,529.

[52] U.S. Cl. .................................... 305/13; 305/54
[51] Int. Cl.² ...................................... B62D 55/28
[58] Field of Search ................ 305/54, 35, 56, 58, 305/59, 13

[56] References Cited

UNITED STATES PATENTS

| 1,339,786 | 5/1920 | Porter et al. | 305/57 |
| 2,568,732 | 9/1951 | Hartdorn | 305/54 |
| 3,278,244 | 10/1966 | Deffenbaugh et al. | 305/54 |

Primary Examiner—Robert B. Reeves
Assistant Examiner—John P. Shannon
Attorney, Agent, or Firm—Phillips, Moore, Weissenberger, Lempio & Strabala

[57] ABSTRACT

A track-type vehicle comprises a plurality of articulated track shoes each comprising a pair of downwardly converging sidewalls terminating at a grouser extending the full width thereof. The sidewalls define a V-shaped trough-like configuration and a track link is releasably attached thereto. A pair of parallel lugs are formed on the upper ends of the sidewalls.

8 Claims, 11 Drawing Figures

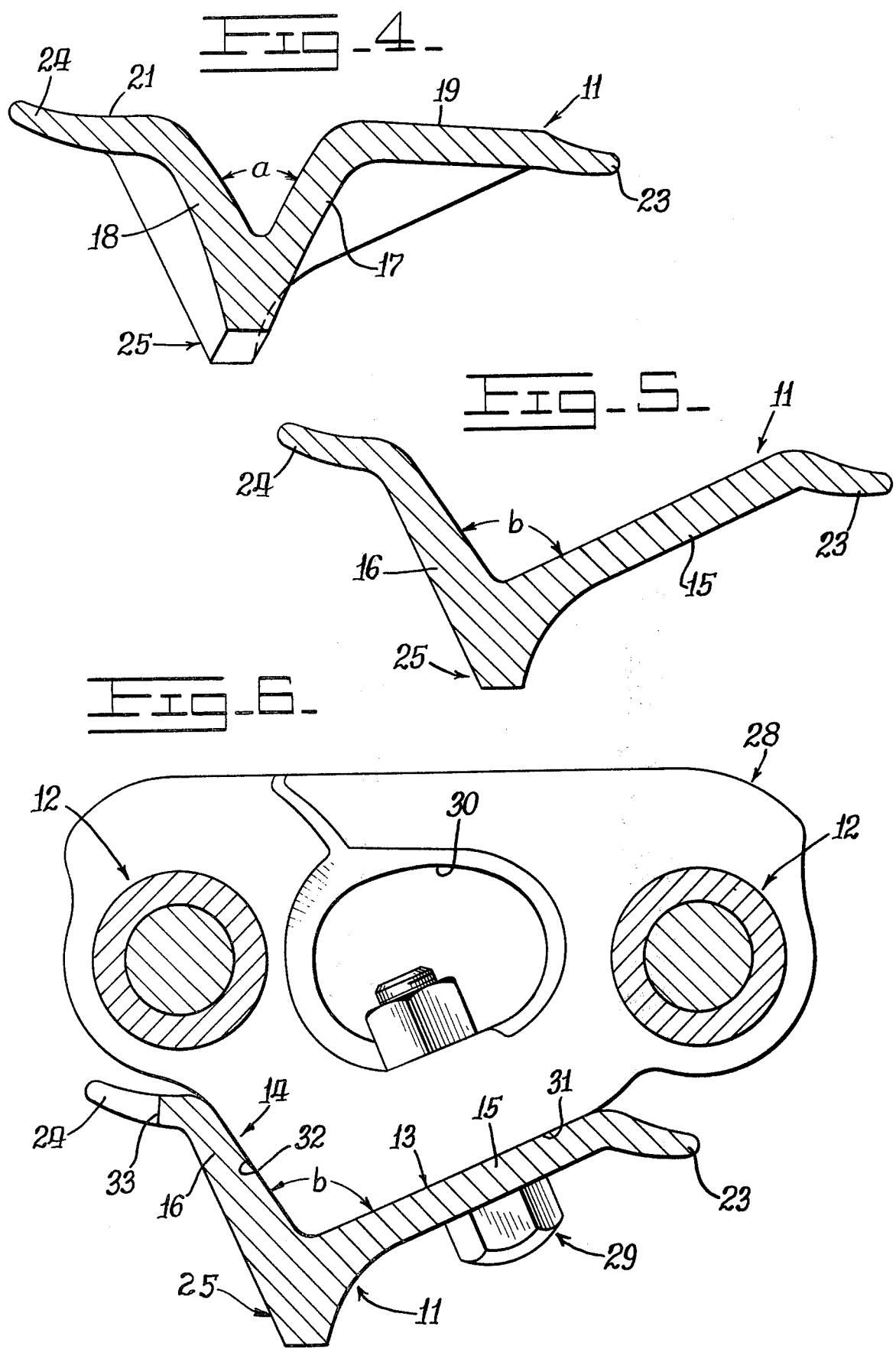

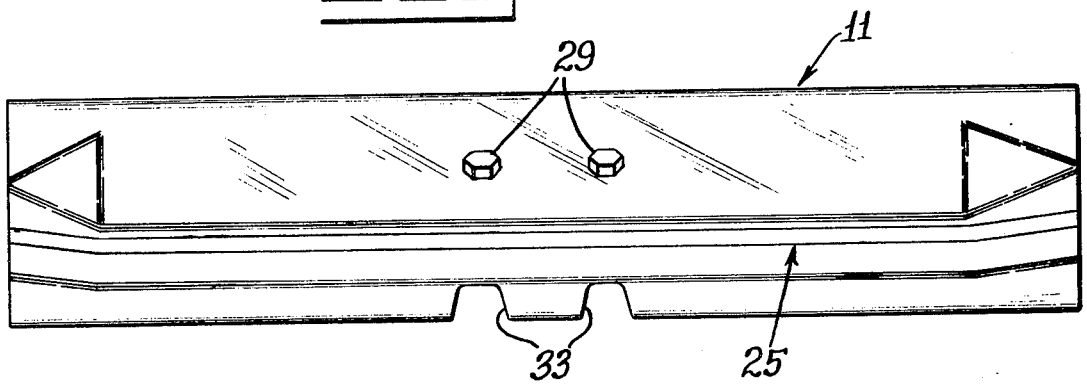
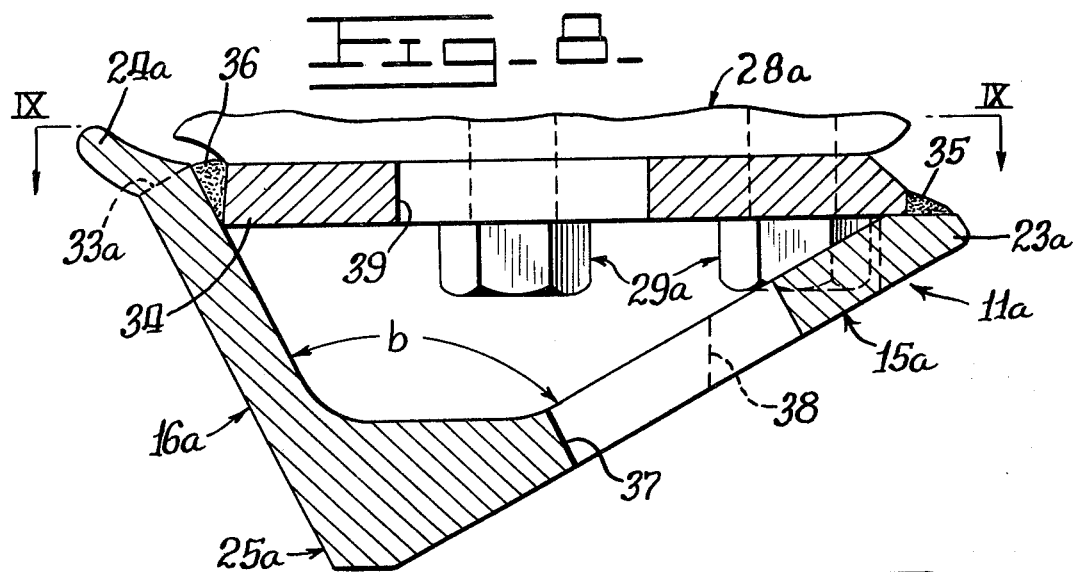
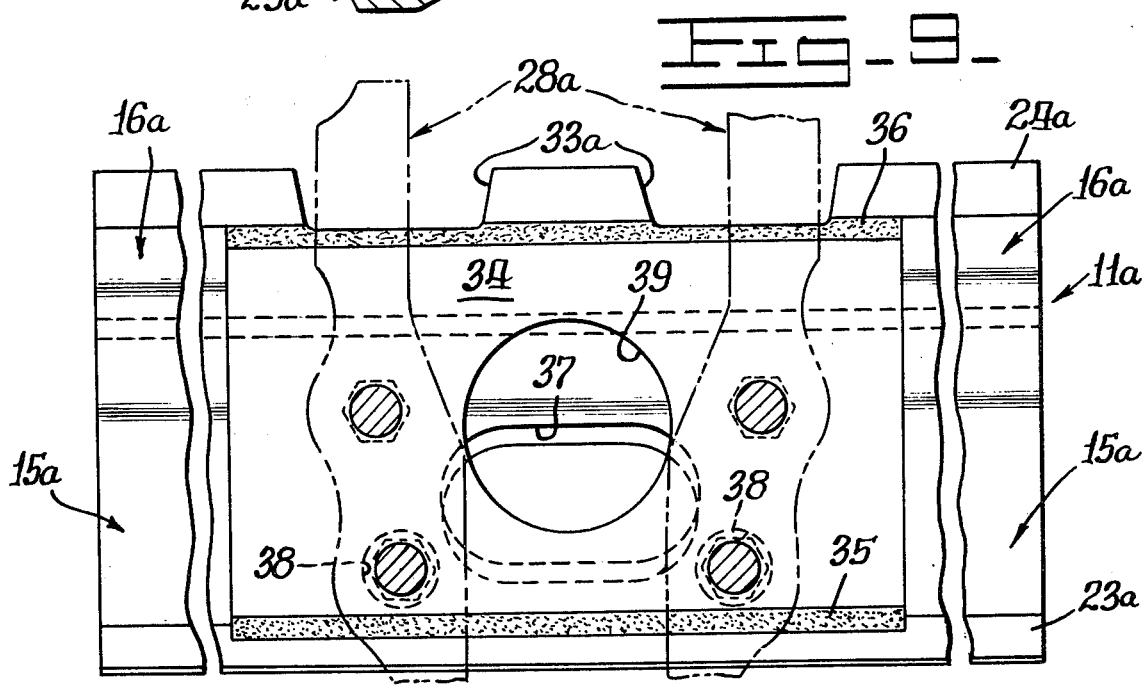

LOW GROUND PRESSURE TRACK SHOE

CROSS-REFERENCE TO RELATED APPLICATION

This application is a divisional of U.S. patent application Ser. No. 517,495, filed on Oct. 24, 1974, and now U.S. Pat. No. 3,937,529.

BACKGROUND OF THE INVENTION

Track-type tractors must often traverse "soft" soils, such as peat and volcanic ash, which gives rise to floatation and traction problems. Various modifications to the track shoes have been proposed to improve the floatation and traction capabilities of the tractor by reducing the unit load on each track shoe. Such modifications usually constitute increasing the size and varying the shape of the track shoe. For example, U.S. Pat. No. 3,278,244, assigned to the assignee of this application, discloses such an improved track shoe. The prior art is further exemplified by U.S. Pat. Nos. 219,452; 1,139,009; 1,142,195; 1,192,423; and 1,265,388; as well as British Pat. No. 818,523.

Such prior art track shoes are normally expensive to manufacture and may tend to fail due to the high internal stresses and impact loads imposed thereon during operation over harder underfootings, such as rock. In addition, the magnitude of the shear loads imposed on bolts, utilized to secure track links to the track shoes, are oftentimes sufficient to cause failure thereof. Also, the lateral ends of such track shoes are normally constructed to inhibit turning of the tractor and tend to churn the soil to inhibit the tractive effort thereof. Furthermore, the track shoes are normally constructed and arranged to entrap contaminants therein which tend to reduce the service life of the track shoes and their attendant structures.

SUMMARY OF THIS INVENTION

An object of this invention is to overcome the above, briefly described problems by providing an economical and self-cleaning track shoe which exhibits a high degree of floatation and traction capabilities when traversing "soft" soils and further exhibits a high degree of structural integrity when traversing harder underfootings. The track shoe comprises a pair of sidewalls which extend downwardly in converging relationship to form an unobstructed trough-like configuration having a V-shaped cross section throughout the entire width of the track shoe. The preferred track shoe embodiment of this invention, when viewed in top plan, has sidewalls which further extend laterally in converging relationship at each lateral end of the track shoe. Lower ends of the sidewalls terminate at a common grouser which extends the entire width of the track shoe and an upper end of each of the sidewalls has a generally horizontally disposed lug formed thereon which also extends the entire width of the track shoe. A link means is attached intermediate the lateral ends of the track shoe to pivotally interconnect a plurality of track shoes together to form an endless track assembly.

BRIEF DESCRIPTION OF THE DRAWINGS

Other objects of this invention will become apparent from the following description and accompanying drawings wherein:

FIGS. 4–6 are enlarged sectional views taken in the direction of arrows IV—IV, V—V and VI—VI, respectively, in FIG. 2;

FIG. 7 is a bottom plan view of the FIG. 2 track shoe;

FIG. 8 is a cross sectional view similar to FIG. 6, but showing a modification of the FIGS. 1–7 track shoe;

FIG. 9 is a top plan view of the FIG. 8 track shoe and attached links, taken in the direction of arrows IX—IX in FIG. 8 and reorientated 90°.

DETAILED DESCRIPTION

Figure 1:
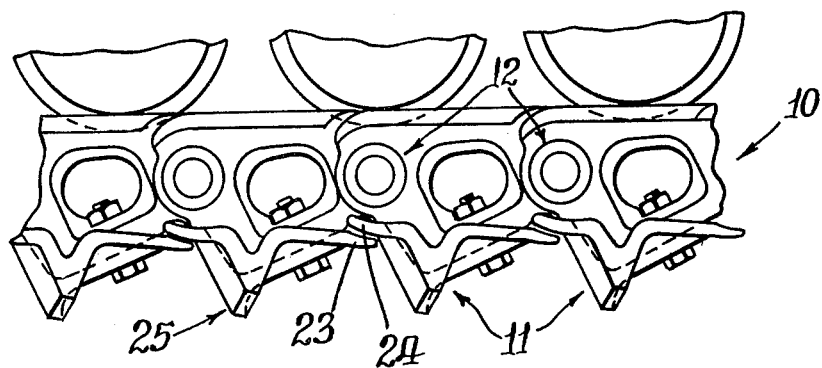
FIG. 1 is a side elevational view of a portion of an endless track assembly employing a plurality of low ground pressure track shoes of this invention thereon.

FIG. 1 partially illustrates an endless track assembly 10 for a track-type tractor comprising a plurality of low ground pressure track shoes 11 pivotally interconnected in a conventional manner by pin and bushing assemblies 12. Referring to FIGS. 2–6, each track shoe comprises a pair of sidewalls 13 and 14 extending downwardly in converging relationship to form an unobstructed trough-like configuration having a V-shaped cross section throughout the entire width of the track shoe. The sidewalls respectively comprise major intermediate wall portions 15 and 16 and minor end wall portions 17 and 18.

Figure 3:
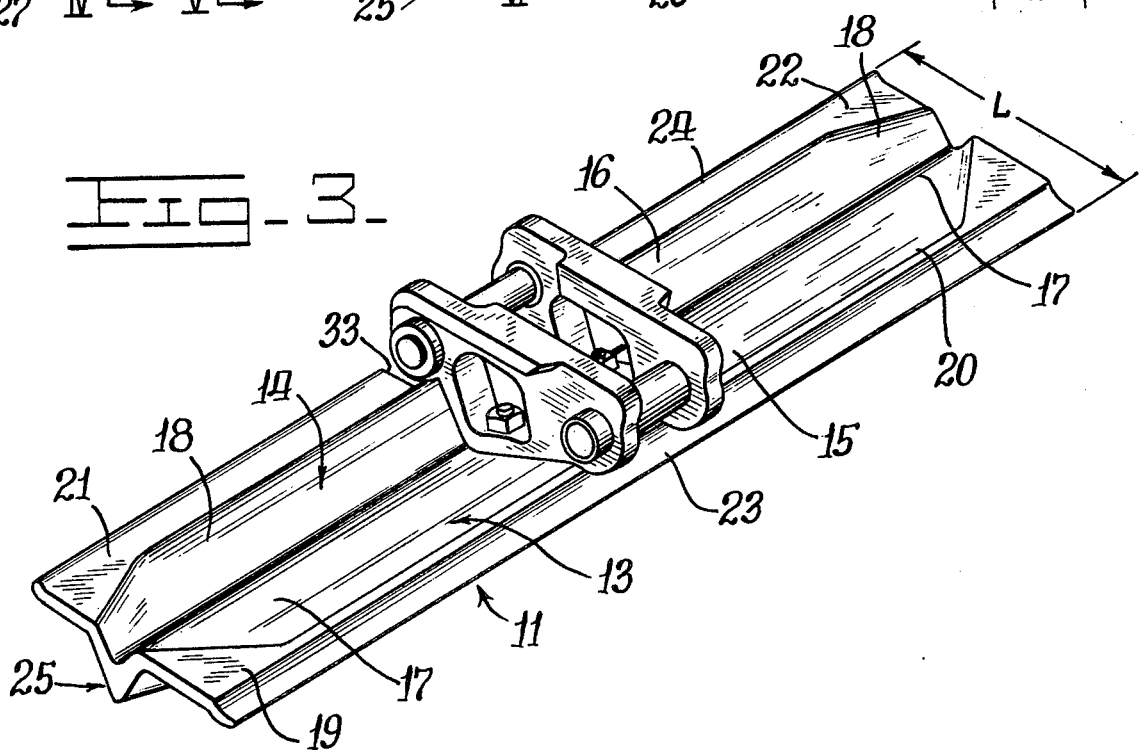
FIG. 3 is a perspective view of the FIG. 2 track shoe and links.

The track shoe may be roll formed to comprise substantially uniform wall thicknesses and thereafter crimped at each end thereof as will be hereinafter more fully described. As shown in FIG. 3, the sidewalls further extend laterally in converging relationship at each lateral end of the track shoe, when viewed in top plan. Such construction is effected during the above-mentioned crimping operation which further defines triangularly shaped and substantially flat portions 19–22 formed at the corners of the rectangular track shoe.

During the preceding roll forming operation, a pair of lugs 23 and 24 are also formed on the upper ends of the sidewalls. Pursuant to the crimping operation, and each flat 19-22 is thus disposed between a respective sidewall and lug. As shown in FIG. 1, lugs 23 and 24 of adjacent track shoes function to continuously overlap each other during tractor operation.

Referring to FIG. 4, wall portions 17 and 18 of sidewalls 13 and 14, respectively bridge flat portions 19 and 21 together and converge downwardly and laterally outwardly to define first included angles $a$ therebetween which diminish in magnitude towards an end of the track shoe. As shown in FIGS. 5 and 6, major wall portions 15 and 16 converge downwardly to define a substantially constant angle $b$ therebetween which is, preferably at least approximately 80°. In the embodiment shown, such angle in obtuse and closely approximates 100° and angle $a$ diminishes laterally outwardly from angle $b$ to approximately 60° in FIG. 4.

Figure 2:
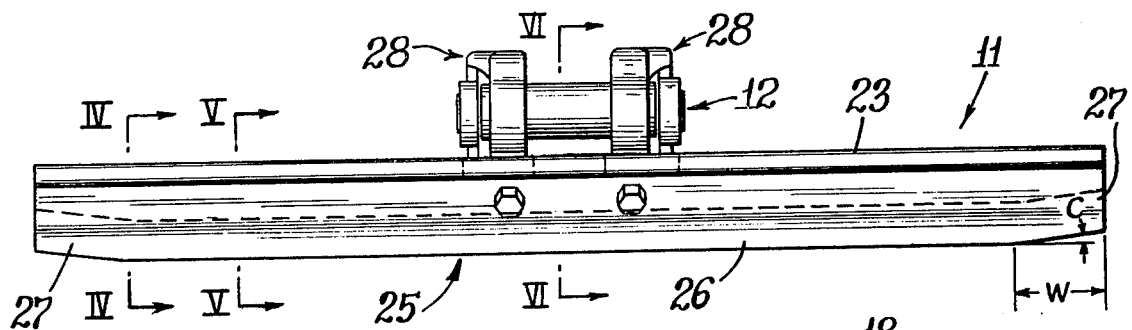
FIG. 2 is a front elevational view of a track shoe having a pair of links attached thereon.

Sidewalls 15 and 16 terminate at a common grouser 25 formed at a lower apex end of the sidewalls to extend the entire width of the track shoe, as shown in FIGS. 2 and 7. The grouser is preferably disposed approximately under a respective pivot means 12 (FIG. 1) and comprises a straight mid-portion 26 which is at least substantially parallel relative to lugs 23 and 24. An end portion 27 of the grouser, at each lateral end of the track shoe, diverges upwardly towards the lugs at an acute angle e, preferably less than 10°, relative to mid-portion 26. In addition, the lateral width $W_1$ of grouser portion 27 is preferably selected from the range of from 25% to 50% of the length $L_1$ of the track shoe.

Referring to FIG. 6, link means constituting a pair of laterally spaced track links 28 straddle sidewalls 13 and 14 between lugs 23 and 24. Each link is directly attached to track shoe 11 intermediate its lateral ends by a releasable attachment or fastening means 29, preferably comprising a single bolt means, i.e., a nut and bolt. The link has an access opening 30 formed transversely therethrough to accommodate the nut as well and a pair of bearing surfaces 31 and 32 formed thereunder to engage wall portions 15 and 16, respectively, in close abutting relationship therewith. Such abutting surfaces absorb substantially all of the operating loads imposed on the track shoe during vehicle operation, i.e., shear loads imposed on fastening means 29 are substantially eliminated. It should be further noted that a pair of notches 33 are preferably formed on lug 24 to eliminate any possible interference thereat with the track links of an adjacent shoe.

Figure 10:
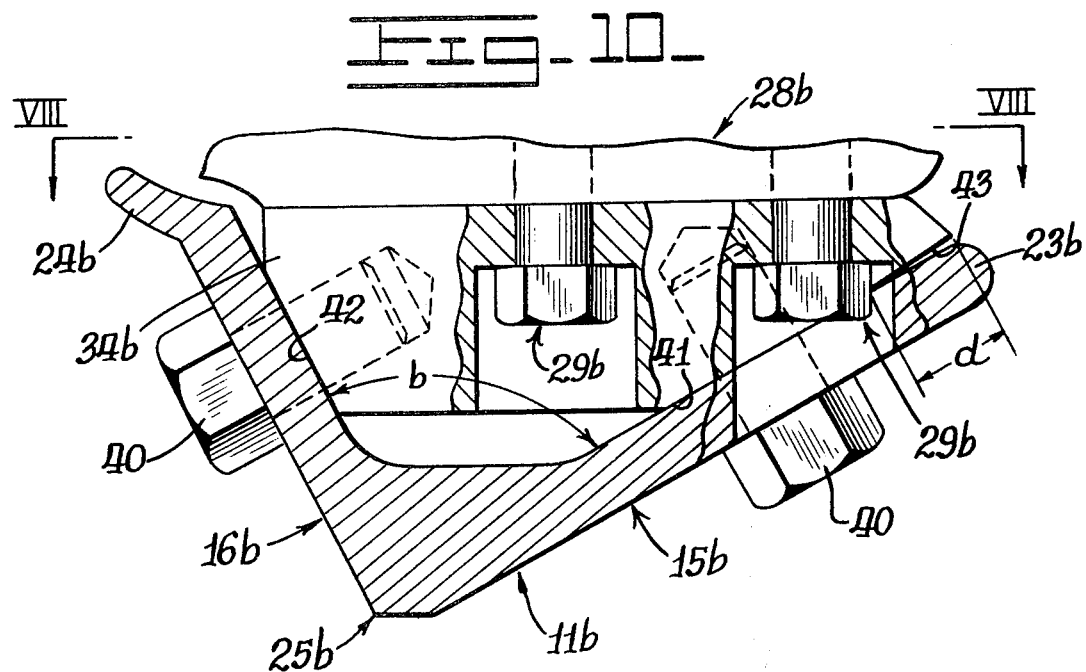
FIGS. 10 and 11 are views similar to FIGS. 8 and 9, respectively, but showing a further modification of the FIGS. 1–7 track shoe.

FIGS. 8 and 9 and FIGS. 10 and 11 illustrate modifications of the above-described track shoe with attached links. Identical numerals appearing in FIGS. 8-11 depict corresponding constructions with numerals appearing in FIGS. 8 and 9 being accompanied by an a and those appearing in FIGS. 10 and 11 being accompanied by a b. As shown in FIGS. 8 and 10, an included angle b between the sidewalls of the respective track shoes is at least substantially constant, e.g., 80°, throughout the entire widths of such track shoes.

FIGS. 8 and 9 disclose a track shoe 11a having a pair of laterally spaced links 28a each attached to the track shoe by attachment means comprising a support member in the form of a separate flat plate 34 and a pair of bolts 29a each threadably attached to a nut (not shown). The flat plate is rectangular to have its sides straddle sidewalls 15a and 16a of the track shoe and secured thereto by a pair of laterally extending and parallel welds 35 and 36. An oblong aperture 37 and a pair of circular apertures 38 are formed through sidewall 15a to provide access to the heads of bolts 29a. A circular aperture 39 is formed through plate 34 to provide an enlarged opening between links 28a to provide egress of entrapped dirt and the like therethrough from the internal cavity of the track shoe when the links engage a drive sprocket (not shown).

Figure 11:
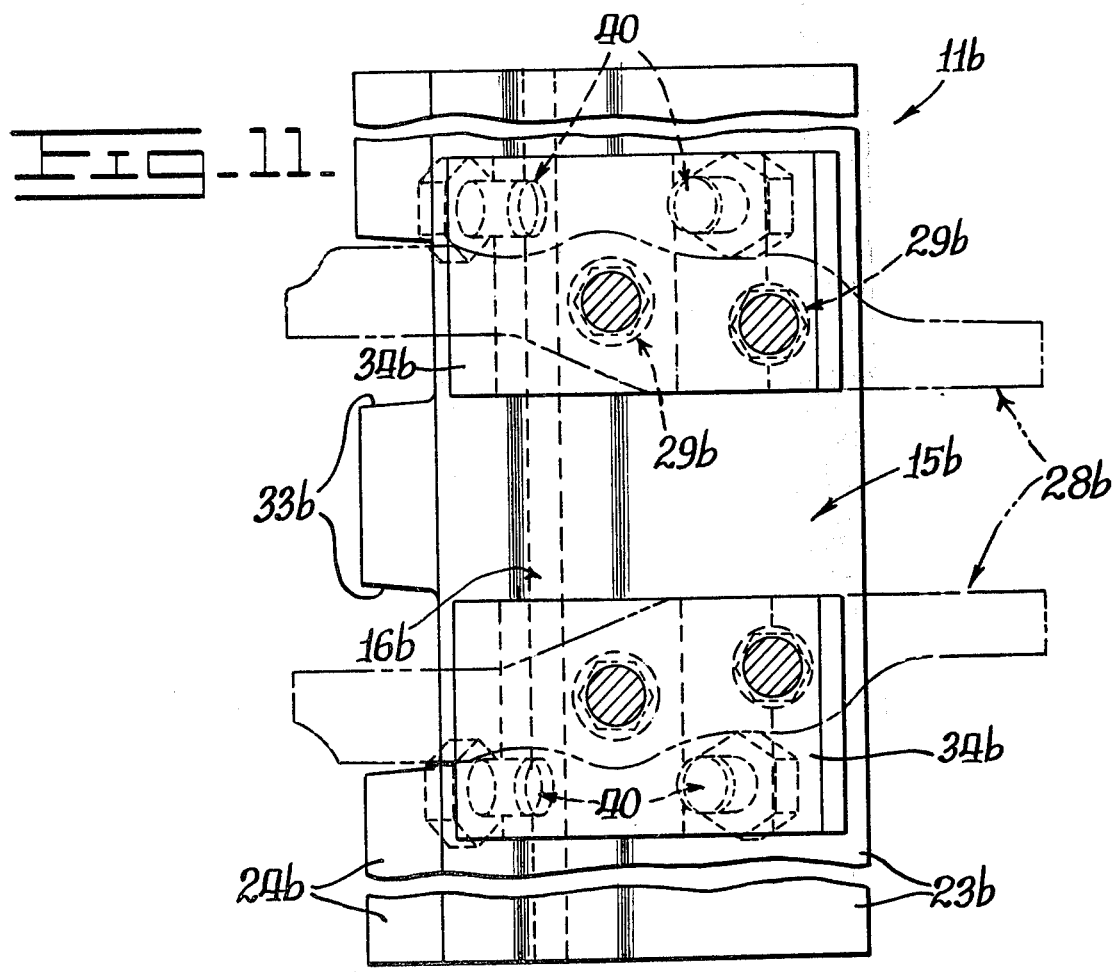

FIGS. 10 and 11 illustrate a track shoe 11b having a pair of laterally spaced links 28b each releasably attached thereto by attachment means comprising pairs of bolts 29b and 40 and a support member in the form of a separate bearing block 34b. Bolts 40, releasably attaching the bearing block to the track shoe, have their heads exposed exteriorly of sidewalls 15b and 16b. Each bearing block has a pair of converging bearing surfaces 41 and 42 formed thereon to abut like-shaped inner surface portions of sidewalls 15b and 16b of the track shoe, respectively.

An outer side of bearing surface 41 is preferably relieved at 43, throughout a distance d, to reduce the amount of initial contact between the bearing surface and sidewall 15b. Such relief will insure a substantial bearing contact between the bearing block and the sidewall upon securance thereof by bolts 40. In particular, the sidewall might be slightly distorted during its roll forming and heat treatment operations and, therefore, relief d aids in assuring intimate contact thereat.

We claim:

1. The combination comprising
    a track shoe including a pair of downwardly converging sidewalls forming a trough-like construction having a V-shaped cross section at least substantially throughout the entire width thereof,
    a common grouser portion formed at lower apex ends of said sidewalls to extend the entire width of said track shoe,
    generally horizontally disposed first and second lugs each formed on an upper end of a respective one of said sidewalls to extend the entire width of said track shoe, the first lug of said track shoe adapted to overlap a second lug of another adjacent track shoe,
    link means disposed between lateral ends of said track shoe and straddling the sidewalls thereof between said first and second lugs,
    attachment means, attaching said link means to said track shoes, comprising a separate support member disposed in straddling relationship between said sidewalls and secured thereto,
    at least one bolt means releasably attaching said link means solely to said support member and
    an access opening formed through at least one of said sidewalls to expose said bolt means.

2. The combination of claim 1 wherein at least substantial portions of the sidewalls of said track shoe are disposed to define an included angle therebetween which at least approximates eighty degrees.

3. The combination of claim 1 wherein an included angle between the sidewalls of said track shoe is at least substantially constant throughout the entire width of said track shoe.

4. The combination of claim 1 wherein said link means constitute a pair of laterally spaced links.

5. The combination of claim 1 wherein said support member constitutes a flat plate having each side thereof welded to an upper portion of a respective sidewall.

6. The combination of claim 5 further comprising means forming a substantially large opening through said plate to expose an internal cavity defined in said track shoe between said sidewalls and said plate.

7. The combination of claim 1 wherein a plurality of said track shoes are pivotally interconnected together by the link means thereof to form an endless track assembly for a track-type vehicle.

8. The combination comprising
    a track shoe including a pair of downwardly converging sidewalls forming a trough-like construction having a V-shaped cross section at least substantially throughout the entire width thereof,
    a common grouser portion formed at lower apex ends of said sidewalls to extend the entire width of said track shoe,
    generally horizontally disposed first and second lugs each formed on an upper end of a respective one of said sidewalls to extend the entire width of said track shoe, the first lug of said track shoe adapted to overlap a second lug of another adjacent track shoe,
    link means disposed between lateral ends of said track shoe and straddling the sidewalls thereof between said first and second lugs, attachment means, attaching said link means to said track shoes, constituting a separate flat plate disposed in straddling relationship between and welded to upper portions of said sidewalls, fastening means releasably attaching said link means to said support member and means forming a substantially large opening through said plate to expose an internal cavity defined in said track shoe between said sidewalls and said plate.

* * * * *